Bernon G. Perkins,
Inventor,
Haynes and Koenig,
Attorneys.

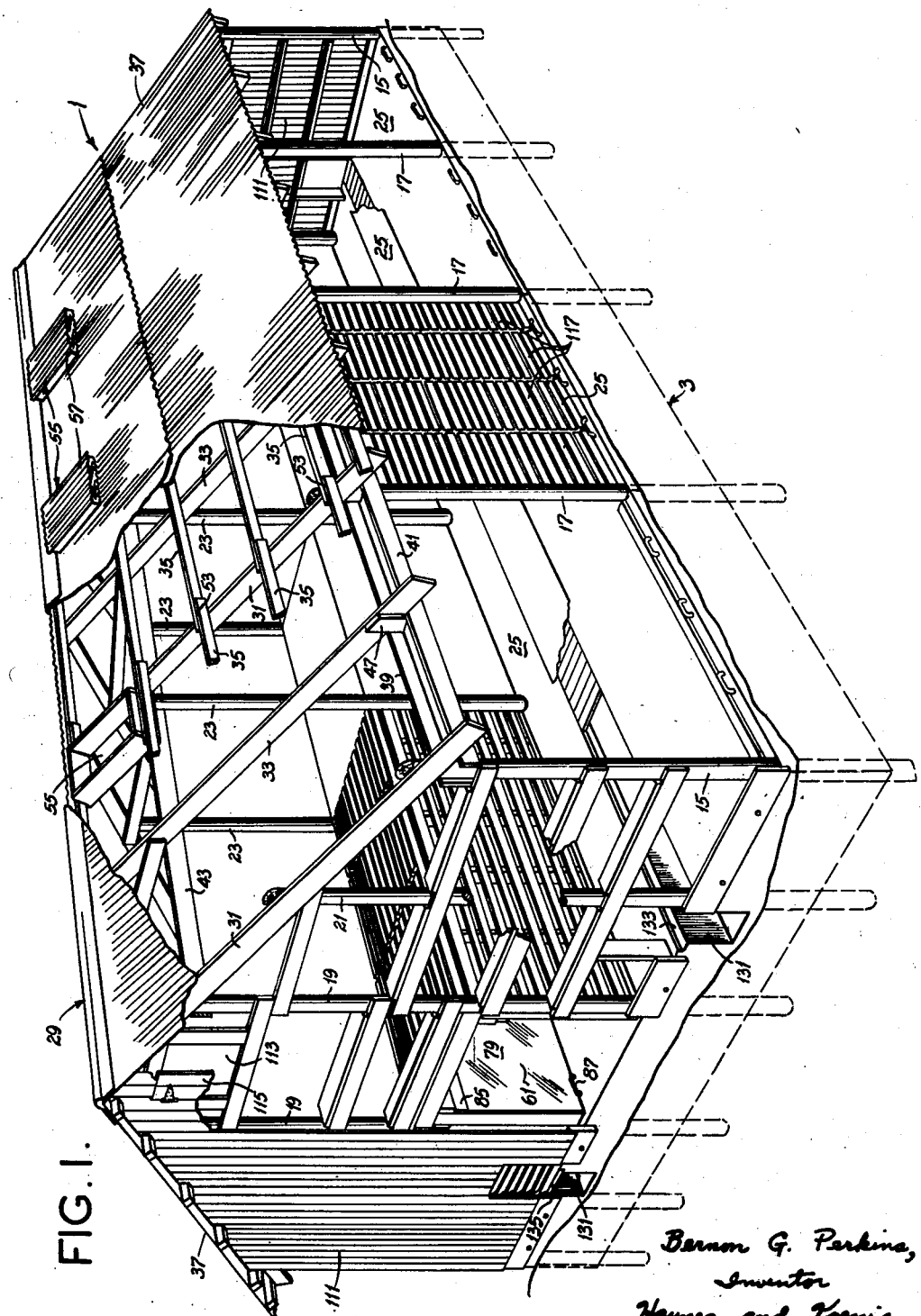

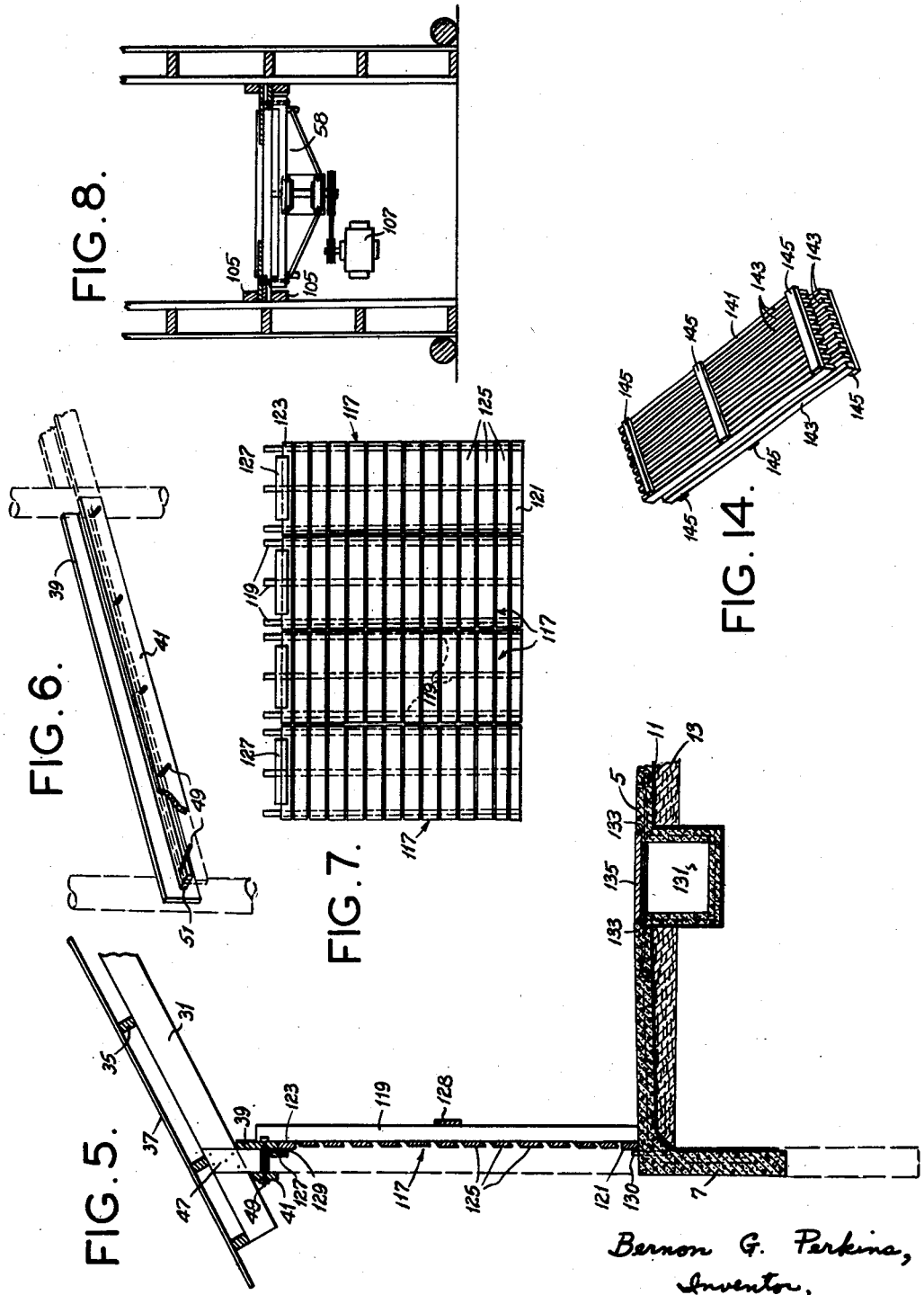

June 16, 1953 B. G. PERKINS 2,641,988
FARM BUILDING

Filed Aug. 1, 1949 4 Sheets-Sheet 4

Bernon G. Perkins,
Inventor,
Haynes and Koenig,
Attorneys.

Patented June 16, 1953

2,641,988

UNITED STATES PATENT OFFICE 2,641,988

FARM BUILDING

Bernon G. Perkins, Kirkwood, Mo., assignor to Doane Agricultural Service, Inc., St. Louis, Mo., a corporation of Missouri Application August 1, 1949, Serial No. 107,877

7 Claims. (Cl. 98—54)

1

This invention relates to farm buildings and more particularly to farm buildings for storing and drying grain, hay, or the like, and for other purposes.

The principal object of the invention is the provision of a low-cost multi-purpose farm building, particularly adapted for storing and drying ear corn, small grain, or hay or the like, and also adapted equally well for use as a machine shed or live stock shed, or for a combination of such uses. As related to the storing and drying of ear corn, the invention is an improvement upon the conventional corn crib, being adapted to permit the farmer economically to raise late-maturing hybrid corn, from which high yields can be obtained, and readily to harvest, store and dry the crop. Heretofore, there has been no satisfactory way for the farmer economically to raise late-maturing hybrid corn and obtain the benefit of its high yield. Such corn, at maturity, has a relatively high moisture content. In modern practice the crop is quickly harvested by mechanical pickers, usually in a matter of weeks, and large quantities must be quickly cribbed. Usually weather conditions are such at the best harvest time for late-maturing hybrids that the crop cannot be satisfactorily dried simply by storing it in conventional corn cribs, depending on natural air-drying. Due to the rapidity of harvesting by mechanical pickers, the cribs are filled quickly, and there is no opportunity to permit the corn to dry by gradually filling the cribs. Field drying of late-maturing hybrids is also unsatisfactory. Corn borers weaken the corn stalks, and if the corn is left to dry in the field too long, they are apt to be broken by winds, and the ears are apt to drop. This requires the field to be cleaned after the harvest by the corn picker, and may result in considerable loss.

This invention provides a low-cost farm building particularly for use as a corn crib for storage and drying, wherein late-maturing hybrid corn, harvested at maturity, may be stored and properly dried under control, despite the weather. With the building of this invention, late-maturing hybrid corn may be harvested soon after the end of the growing period, when the moisture content of the stalks and shucks is such that mechanical corn pickers can harvest cleanly. The construction of the building is such that the harvested corn may be stored in the building in a natural pile or heap, and dried by forcing a draft of air through the pile. Construction features of the building are such that it may be erected

2 at low cost. It has a low-cost pole frame and roof structure, the latter protecting the corn in storage from rain and snow. An important feature of the construction is the provision of readily removable sides, which may be quickly removed to adapt the building for use as a machine shed or live stock shed, for hay storage, or other uses. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a perspective of a building embodying the features of the invention, parts being broken away and shown in section;

Fig. 5 is an enlarged fragmentary vertical transverse cross section;

Fig. 6 is a fragmentary perspective illustrating certain rafter supports;

Fig. 7 is an elevation of an assembly of removable side wall panels;

Fig. 8 is a horizontal section taken substantially on line 8—8 of Fig. 4;

Similar reference characters indicate corresponding parts throughout the several views of the drawings.

Figure 4:
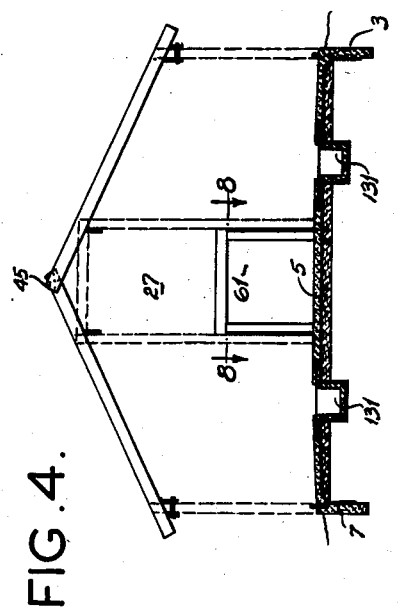
Fig. 4 is a vertical transverse cross section.
Figure 2:
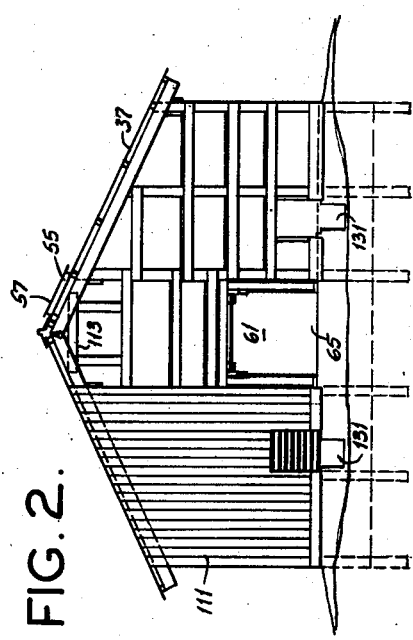
Fig. 2 is an end view of the building, with parts broken away.
Figure 3:
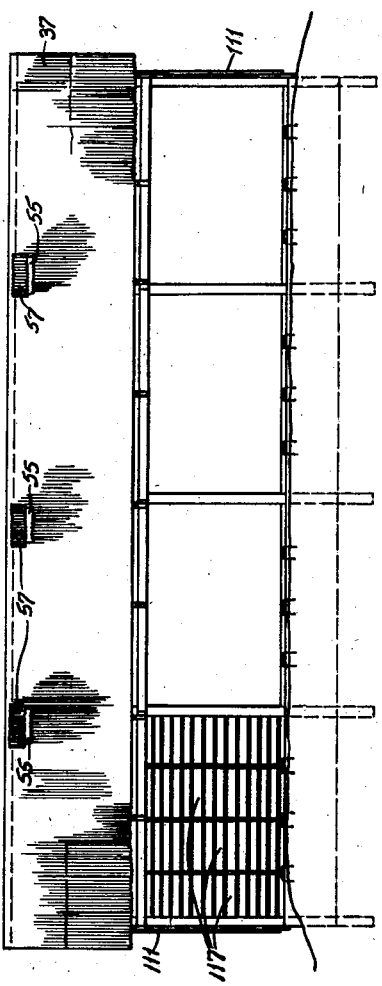
Fig. 3 is a side elevation.
Figure 12:
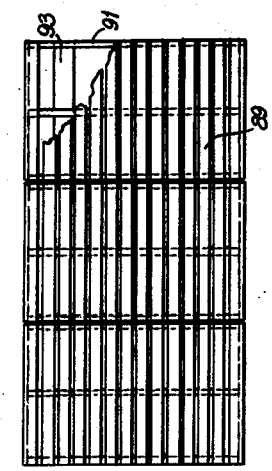
Fig. 12 is a plan of an assembly of tunnel top sections.
Figure 11:
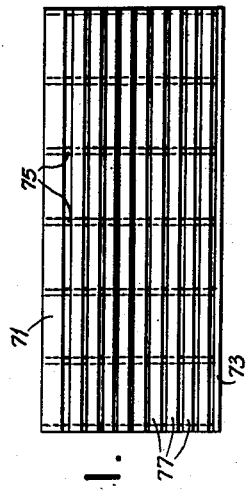
Fig 11 is an elevation of a tunnel side section.

Referring to the drawings, first more particularly to Figs. 1-4, a farm building structure incorporating the features of the invention is designated 1 in its entirety. The building has a reinforced concrete foundation 3 comprising a floor 5 and a frost wall 7 extending down into the ground at the sides and ends of the floor.

The latter is shown as poured on a vapor seal 11 laid on a fill 13, preferably of gravel. The building is of wooden pole frame construction and comprises corner poles 15, side poles 17, end poles 19 and 21, and interior poles 23. The poles preferably are chemically treated to resist decay. They are set in the ground prior to pouring the concrete foundation and become embedded in the concrete. The side poles 17 are spaced at equal intervals between the corner poles and divide the building into transverse bays 25. As shown, there are three side poles 17 between the corner poles 15 at each side of the building dividing it into four bays. The end poles 19 are spaced equal distances on the opposite sides of the longitudinal center line of the building and the end poles 21 are set midway between the respective end poles 19 and corner poles 15. The poles 19 and 21 at each end of the building are in transverse alignment with the corner poles 15 at the respective end. The interior poles 23 are transversely aligned with the side poles 17 and longitudinally aligned with the end poles 19. The end poles 19 and the interior poles 23 define an aisle 27 extending centrally from one end of the building to the other.

The poles support a gable roof structure 29 comprising rafters 31 and 33, purlins 35, and corrugated sheet metal roofing 37. The rafters, at their outer and lower ends, rest on inside and outside rafter supports 39 and 41 (Figs. 5 and 6) respectively. The inside rafter supports 39 consist of timbers nailed to the insides of the corner poles 15 and the side poles 17 adjacent the upper ends of the poles. The outside rafter supports 41 consist of smaller timbers nailed to the outsides of the corner poles 15 and the side poles 17 adjacent the upper ends of the poles. Adjacent their upper ends, the rafters rest on longitudinal rafter supports 43 (Figs. 1 and 4) consisting of timbers nailed to the end poles 19 and interior poles 23 adjacent their upper ends. The upper ends of each pair of rafters meeting at the ridge of the roof are over-lapped and nailed together as indicated at 45 (Fig. 4). There is no ridgepole. This eliminates any necessity for accurately cutting the rafters to length and simplifies construction. They are simply set and nailed in place.

Rafters 31 are located at the corner and side poles and are nailed to these poles. Rafters 33 are located midway between the poles. These are nailed to rafter blocks 47 set between the inside and outside rafter supports 39 and 41 midway between the poles. Supports 39 and 41 are bolted together as indicated at 49. The bolts extend through timber spacers 51 which, with supports 39 and 41, form an H-beam, the spacers 51 forming the web of the beam and being horizontal. The blocks 47 rest on and are nailed to these spacers. The purlins 35 are somewhat longer than twice the spacing of the rafters. They are set on edge on the rafters with their ends overlapping, as indicated at 53. This over-lapped arrangement eliminates any necessity for cutting the purlins. The sheet metal roofing 37 is laid on the purlins. Openings 55 are provided in the roofing. These openings are provided with corrugated sheet metal covers or caps 57. Any bay may be filled with corn or other grain through a roof opening, to cause the corn or other grain to pile up in the bay in a more or less natural conical pile.

As illustrated, a tunnel 61 extends centrally and longitudinally of the building through the aisle 27 from one end thereof to the other. Corn falling into the bays through the roof openings 55 piles up over and alongside of the tunnel in more or less conical natural piles. Within the tunnel adjacent one end of the building is a fan 59 (Fig. 8) adapted to draw in air through the adjacent open end of the tunnel and blow it through the tunnel. The other end of the tunnel is closed by a door 65.

The tunnel 61, which is illustrated in detail in Figs. 8-13, is rectangular in cross section, having sides 67 and a top 69. The floor 5 forms its bottom. Each side 67 is made up of individual sections 71 (Fig. 11), one in each bay, each section being as long as the unit longitudinal spacing of the interior poles 23. Each section 71 comprises a floor board 73 and a series of vertical studs 75 extending up from the floor board. To the outer edges of the studs are nailed spaced-apart, longitudinal, horizontal side boards 77. A plywood panel 79 is nailed to the inner edges of the studs and the inner edge of the floor board. Inner and outer longitudinal head boards 81 and 83 are nailed to the inner and outer edges of the studs at their upper ends. A board 85 nailed to the inside edges of the studs closes a space between the upper edge of the plywood panel 79 and the inner head board 81. The side sections 71 are slid into place at the sides of the aisle 27 on the inside of the poles 19 and 23. They are removably retained in position at the sides of the aisle between the inside of the poles and retainers 87 set in the concrete floor 5. The retainers are low in height (about two inches high, for example) and have rounded edges for a purpose to be mentioned. As shown they consist of a U-shaped length of pipe, set in the concrete in inverted position. The top 69 of the tunnel 61 is made up of individual rectangular sections 89 (Fig. 12), three in each bay, each panel having a length corresponding to the width of the tunnel and a width corresponding to one-third the unit longitudinal spacing of the interior poles 23. Each section comprises a frame including boards 91 set on edge and extending transversely of the tunnel. To the bottom edges of these transverse boards are nailed two boards 93 extending longitudinally of the tunnel. The boards 93 are transversely spaced apart to fit within the top of the tunnel between the head boards 81. A plywood closure panel 95 is removably attached to the bottoms of the boards 93, one side of the panel fitting in a groove 97 defined by a board 98 and a spacing batten 99, its other side being held up by a pivoted latch 100. Top boards 101 are laid on the upper edges of the transverse boards 91 extending longitudinally and spaced apart transversely. Side boards 103 extend across the ends of the transverse boards 91, the latter resting loosely and removably on the head boards 81 and 83 of the tunnel sides.

The top 69 of the tunnel is made up of smaller sections than the side sections 71 of the tunnel for ease in installing and removing. It will be noted that while the side sections 71 may be slid into or out of place, the top sections 89 must be lifted into place, and lowered for removal. Making them relatively small reduces the weight that has to be lifted or lowered and facilitates installation and removal. The plywood panels 95 are removable to provide openings through the top of the tunnel for escape of air to flow through corn piled on and alongside the tunnel for drying purposes. The spacing of the tunnel side boards 77 and top boards 101 is such that ears of corn cannot fall through. Panels 79 close the tunnel sides and prevent air from escaping therethrough. They also brace and strengthen the side sections.

Figure 13:
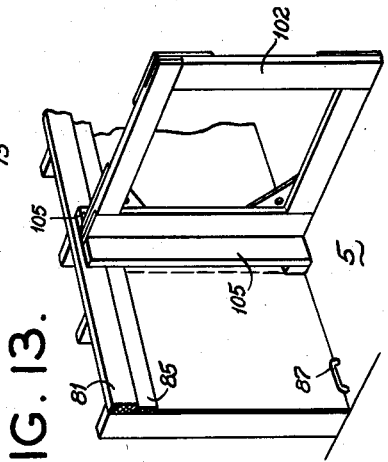
Fig. 13 is a detail perspective, with parts broken away and shown in section, of a fan mounting; and, Fig. 14 is a perspective illustrating a modified type of removable side wall panels.
Figure 10:
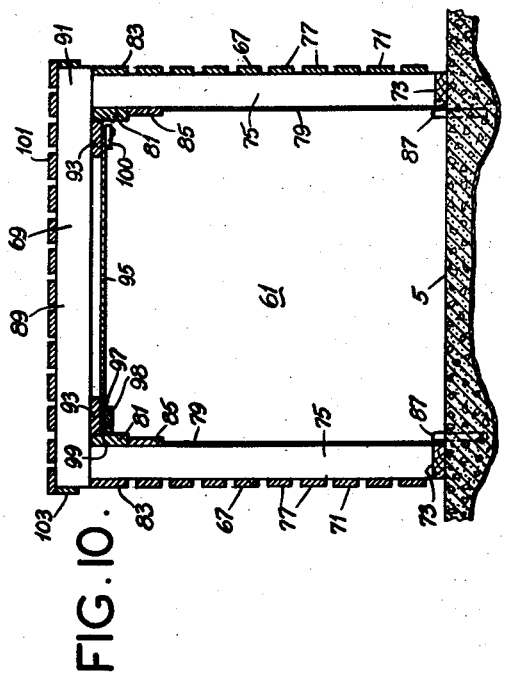
Fig. 10 is a vertical transverse cross section of the tunnel.
Figure 9:
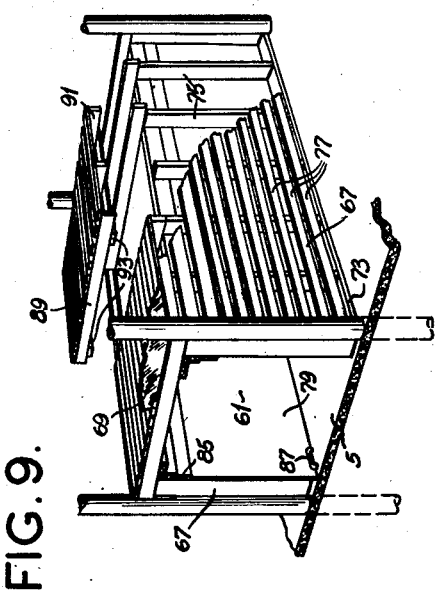
Fig. 9 is a perspective of a tunnel in the building.

The fan 57 is mounted in a rectangular frame 102 (Figs. 8 and 13). This frame slips into guideways at the sides of the tunnel formed by pairs of boards 105 nailed to the insides of the tunnel side sections. The frame rests on the floor 5. The fan is driven by an electric motor 107 bolted to the floor.

The ends of the building, except for the ends of the tunnel, are closed in by siding 111. Door openings 113 may be provided in the ridges of the building, closed by doors 115. The sides of the building are closed in by removable rectangular side panels 117 (Figs. 5 and 7). Each of these panels has a width corresponding to one-fourth the spacing of the side poles 17 and a height such as to extend somewhat higher than the lower edges of the rafter supports 39 and 41. Each panel 117, as illustrated, comprises three vertical studs 119. Nailed to the outside edges of the studs at their lower ends is a base board 121. Nailed to the outside edges of the studs adjacent but lower than their upper ends is a head board 123. This is located at such a height as to fit just under the inner rafter support 39. Between the base board 121 and the head board 123, beveled siding boards 125 are nailed to the outside edges of the studs. The siding boards extend horizontally and are spaced apart vertically at intervals such that ears of corn cannot fall between them. At the upper end of each panel 117 is a key 127 positioned to extend upward on the outside of the inner rafter support 39 between the latter and the outer rafter support 41. The key consists of a board nailed to the outside of the head board 123 through a spacer strip 129 and extending above the head board. The panel may be braced by a board 128 nailed horizontally across the inside edges of the studs about midway of the height of the panel.

The side panels 117 are set in place closing the sides of the building by bringing them into upright position inside the building, tilting them to enter the key boards 127 between the inner and outer rafter supports 39 and 41, and then sliding their lower ends outward until they engage retainers or stops 130. The latter are identical with the previously described retainers 87. They prevent the side panels from being pushed outward by corn in storage. The lower margin of the inner rafter support 39 is in keying engagement with the upper ends of the panels between the key boards 127 and the upper ends of the studs 119 and prevents the upper ends of the side panels from being pushed either in or out.

If the building is used continually for corn storage, sheller trenches 131, one on each side of the tunnel, may be provided in the floor 5. These extend longitudinally from one end of the building to the other. The sides of the trench are recessed at the top, as indicated at 133, to receive removable floor boards 135 flush with the floor. The trenches accommodate a drag or conveyor for removing ears of corn. If the building is not to be used continually for corn storage, the trenches may be omitted. Corn may be removed by entering a drag in the tunnel 61 and removing the necessary top plywood panels 95 and a number of the tunnel top boards 101 to allow ears of corn to fall into the tunnel. Under these circumstances, a number of the top boards 101 are not nailed down so that they may be readily removed even though corn is piled up over the tunnel. A loose board would be worked back and forth until one end could be drawn down into the tunnel, thus permitting complete removal of the board from within the tunnel although ears of corn are piled over the tunnel.

For drying and storing corn, the corn is piled over and around the tunnel 61 by dropping it into the building through the roof openings 55. This may be done with portable elevators. The corn piles up over and alongside the tunnel in natural pile formation. In effect, the building structure provides an enclosure (sides and a roof) for a natural pile of corn with an air duct through the pile. To dry the corn, the top of the tunnel is opened to provide air outlet apertures for escape of air from the tunnel to flow through the pile by removing as many of the removable top plywood closure panels 95 as may be necessary to obtain the best flow of air through the pile for drying purposes. In practice, the tunnel is made large enough to enter to remove or replace the panels. The two top sections 89 at the ends of the tunnel may have their plywood closure panels 95 nailed in place, rather than being made removable, to prohibit air movement through these sections and thereby limit by-passing of air at the ends of the building. Dried corn may be removed through the sheller trench, or through the tunnel, as previously described. With the corn piled in natural pile formation, the end walls and side wall panels are not required to resist any substantial horizontal thrust, and hence may be made of lighter, less expensive construction than if required to resist such thrust. This represents a considerable advantage over prior corn cribs which are completely filled so that their side and end walls must be made of heavy timbers heavily braced to resist horizontal thrust.

The building may be used for storing small grain, such as wheat, oats, barley, etc., by lining the side wall panels and the tunnel sections with asphalt paper, wire screen or the like. The tunnel sections may be removed from one or more or all of the bays to adapt part or all of the building for use as a machine shed or a live stock shed. The use of the U-shaped pipe retainers 87 and 130 is advantageous under such circumstances as vehicles may be driven over them without damage and they will not injure the feet of live stock. The structure may also be used for storage and drying of hay, using the tunnel for air distribution.

Fig. 14 illustrates a modified side wall panel construction adapted for use where it may be desired to have open-construction side walls on both sides of the building under some circumstances and solid side walls on one side of the building under other circumstances. Side wall panels designated 141 in Fig. 14 are used for the purpose. Each of these consists of a series of vertical siding members or studs 143 held together by horizontal boards 145 nailed to the edges of the studs on one side. The studs are spaced apart at intervals corresponding to their widths so that the studs of one panel may fit closely between the studs of another panel to make a solid wall section. Such panels are conveniently made by assembling a group of studs engaging one another side-by-side, nailing boards 145 to every other stud on one side of the group, and nailing other boards 145 to the remaining studs on the other side of the group. In each panel, the studs are spaced at intervals such as to prevent ear corn from falling through. The panels may be lined with screen to hold small grain.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A farm building comprising a concrete floor, a pole frame comprising poles set in the floor at the corners and along the sides and ends of the building and interiorly of the building defining an aisle extending from one end of the building to the other, the corner and side poles defining bays extending transversely of the building, a roof supported by the poles provided with openings, an air distribution tunnel extending through the aisle, said tunnel comprising side sections extending at the sides of the aisle from pole to pole resting on the floor and held in place between the sides of the poles and retainers fixed in the floor, and top sections loosely resting on the upper edges of the side sections, each top section being of open-construction and provided with a closure panel on its bottom, the closure panels for at least some of the top sections being removable from inside the tunnel, each tunnel side section extending the full width of each bay and each tunnel top section extending a fraction of the width of each bay.

2. A farm building comprising a concrete floor, a pole frame comprising poles set in the floor at the corners and along the sides and ends of the building and interiorly of the building defining an aisle extending from one end of the building to the other, the corner and side poles defining bays extending transversely of the building, a roof supported by the poles provided with openings, an air distribution tunnel extending through the aisle, said tunnel comprising side sections extending at the sides of the aisle from pole to pole resting on the floor and held in place between the insides of the poles and retainers fixed in the floor, and top sections loosely resting on the upper edges of the side sections, each retainer comprising a pipe bent to U-shape and set in the concrete floor in inverted position.

3. A farm building comprising a concrete floor, a pole frame comprising poles set in the floor at the corners and along the sides and ends of the building and interiorly of the building defining an aisle extending from one end of the building to the other, the corner and side poles defining bays extending transversely of the building, a roof supported by the poles provided with openings, an air distribution tunnel extending through the aisle, said tunnel comprising side section extending at the sides of the aisle from pole to pole resting on the floor and held in place between the insides of the poles and retainers fixed in the floor, and top sections loosely resting on the upper edges of the side sections, and open-construction removable side wall sections for the building, said side wall sections resting at their lower ends on the floor, and removably keyed to the building frame at their upper ends, the outside of the lower ends of the side wall sections engaging against retainers fixed in the floor.

4. A farm building comprising a concrete floor, a pole frame comprising poles set in the floor at the corners and along the sides and ends of the building and interiorly of the building defining an aisle extending from one end of the building to the other, the corner and side poles defining bays extending transversely of the building, a roof supported by the poles provided with openings, an air distribution tunnel extending through the aisle, said tunnel comprising side sections extending at the sides of the aisle from pole to pole resting on the floor and held in place between the insides of the poles and retainers fixed in the floor, and top sections loosely resting on the upper edges of the side sections, and open-construction removable side wall sections for the building, said side wall sections resting at their lower ends on the floor, and removably keyed to the building frame at their upper ends, the outside of the lower ends of the side wall sections engaging against retainers fixed in the floor, each of said retainers comprising a pipe bent to U-shape and set in the concrete floor in inverted position.

5. A farm building comprising a concrete floor, a pole frame comprising poles set in the floor at the corners and along the sides and ends of the building and interiorly of the building defining an aisle extending from one end of the building to the other, the corner and side poles defining bays extending transversely of the building, a roof supported by the poles provided with openings, an air distribution tunnel extending through the aisle, said tunnel comprising side sections extending at the sides of the aisle from pole to pole resting on the floor and held in place between the insides of the poles and retainers fixed in the floor, and top sections loosely resting on the upper edges of the side sections, the roof being a gable roof comprising rafters, purlins and roofing, the outer ends of the rafters being supported by rafter supports carried by the upper ends of the corner and side poles, the inner and upper ends of each pair of rafters meeting at the ridge of the roof being overlapped and fastened together, the purlins being set on edge on the rafters with their ends overlapping.

6. A farm building comprising a concrete floor, a pole frame comprising poles set in the floor at the corners and along the sides and ends of the building and interiorly of the building defining an aisle extending from one end of the building to the other, the corner and side poles defining bays extending transversely of the building, a roof supported by the poles provided with openings, an air distribution tunnel extending through the aisle, said tunnel comprising side sections extending at the sides of the aisle from pole to pole resting on the floor and held in place between the insides of the poles and retainers fixed in the floor, and top sections loosely resting on the upper edges of the side sections, the roof being a gable roof comprising rafters, purlins and roofing, the outer ends of the rafters being supported by rafter supports carried by the upper ends of the corner and side poles, the inner and upper ends of each pair of rafters meeting at the ridge of the roof being overlapped and fastened together, the purlins being set on edge on the rafters with their ends overlapping, and open-construction removable side wall sections for the building, said side wall sections resting at their lower ends on the floors and being removably keyed at their upper ends to the rafter supports, the outsides of the lower ends of the side wall sections engaging against retainers fixed in the floor.

7. A farm building comprising a concrete floor, a pole frame comprising poles set in the floor at the corners and along the sides and ends of the building and interiorly of the building defining an aisle extending from one end of the building to the other, the corner and side poles defining bays extending transversely of the building, a roof supported by the poles provided with openings, an air distribution tunnel extending through the aisle, said tunnel comprising side sections extending at the sides of the aisle from pole to pole resting on the floor and held in place between the insides of the poles and retainers fixed in the floor, and top sections loosely resting on the upper edges of the side sections, and open-construction removable side wall sections for the building, said side wall sections resting at their lower ends on the floor, and removably keyed to the building frame at their upper ends, the outside of the lower ends of the side wall sections engaging against retainers fixed in the floor, each side wall section comprising a series of spaced siding members, any side wall section on one side of the building being adapted to have its siding members fitted between the siding members of any side wall section on the other side of the building thereby to form solid wall sections on said other side of the building.

BERNON G. PERKINS.

References Cited in the file of this patent

UNITED STATES PATENTS

| Number | Name | Date |
| --- | --- | --- |
| 324,456 | Carskadon | Aug. 18, 1885 |
| 1,005,983 | Larch | Oct. 17, 1911 |
| 1,043,624 | Parker | Nov. 5, 1912 |
| 1,256,677 | French | Feb. 19, 1918 |
| 1,421,299 | Palen | June 27, 1922 |
| 1,431,046 | Robertson | Oct. 3, 1922 |
| 1,470,298 | Straight | Oct. 9, 1923 |
| 1,673,788 | Hobson | June 12, 1928 |
| 2,000,102 | Shodron | May 7, 1935 |
| 2,142,692 | Kuppers | Jan. 3, 1939 |

FOREIGN PATENTS

| Number | Country | Date |
| --- | --- | --- |
| 81,175 | Switzerland | June 16, 1919 |
| 52,423 | Sweden | Nov. 8, 1920 |

OTHER REFERENCES

"Barn Haydrier," Agricultural Engineering Publication No. 6; Tennessee Valley Authority, Knoxville, Tennessee, April 1945, reprinted June 1945. Pages 21 and 51 relied on.